United States Patent Office 2,839,242
Patented June 17, 1958

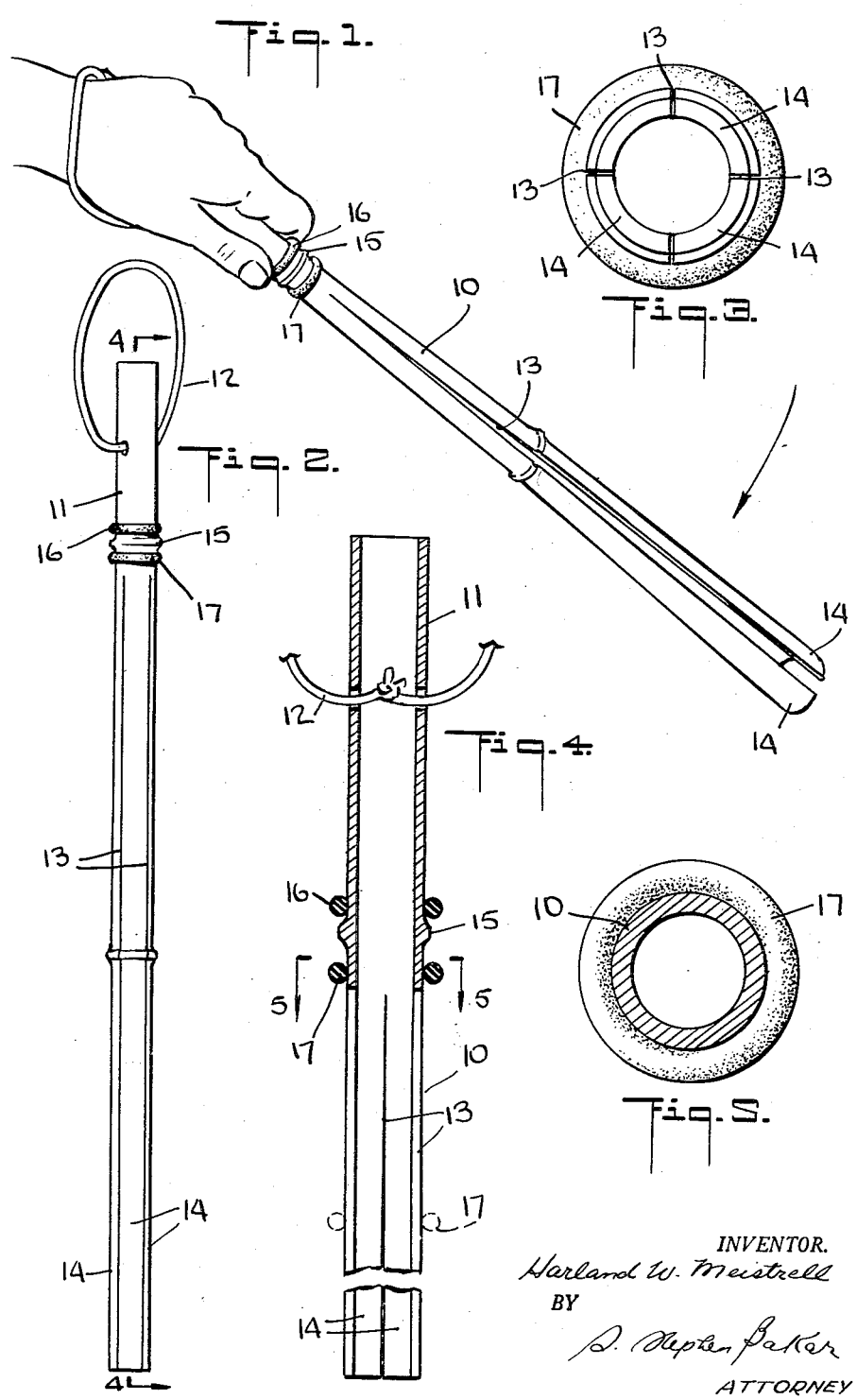

2,839,242
ANIMAL TRAINING DEVICE
Harland W. Meistrell, Great Neck, N. Y.

Application May 18, 1955, Serial No. 509,331

5 Claims. (Cl. 231—2)

This invention relates to an animal training device and more particularly to a training device for dogs and may be employed in teaching a dog obedience or to perform various stunts or for any other analogous purpose. The present application is a continuation in part of my prior application Serial No. 446,587, filed July 29, 1954, now abandoned.

The invention comprises a simple elongated rod preferably having handle means at one end while the other end is employed to apply a blow of modified impact force to the body of the dog while simultaneously creating a particular noise, i. e., of a crackling or rattling nature which is not a well defined noise but which is constantly variable so that the dog does not become inured to the sound and responds promptly and obediently even over long periods of time. Such a rattling, variable sound is found to be superior in effect to one which produces a simple whacking sound or one which is in the nature of a slap and which is always substantially the same.

More specifically, the invention takes the form of an elongated rod which is longitudinally split into a plurality of arcuate sections forming in the aggregate a tube wherein the arcuate sections normally make edge-to-edge contact with each other. When an object, i. e., the flank of a dog is struck with the device, the arcuate sections crackle against each other in random or haphazard form to produce the desired rattle.

The invention further comprises annular ring members which both strengthen the rod and also serve to selectively modify the nature of the rattle as desired.

The invention will be further understood from the following description and drawings in which:

Figure 1 is a perspective view illustrating the operation of the training rod;

Figure 2 is an elevational view thereof;

Figure 3 is a front end view thereof;

Figure 4 is an enlarged cross-sectional view taken along the line 4—4 of Figure 2; and Figure 5 is an enlarged cross-sectional view taken along the line 5—5 of Figure 4.

The device comprises an elongated rod 10 which, in the form shown, is of bamboo although it may be fabricated of plastic or metal, as desired. The upper end 11 serves as a handle, a thong 12 being provided to assist in holding the device or hanging it up when not in use.

The rod is in substantially tubular form and is provided with a plurality of elongated parallel splits 13 herein illustrated as four in number so as to provide four arcuate sections 14 which are in normal edge-to-edge contact thus forming in the aggregate a circle. The splits 13 extend all the way up the application section of the tubular rod to the handle section, or about ⅘ of its length in the form shown.

The rod is shown as being formed of bamboo, a length thereof being preferably selected which is formed with the natural, integral annular ridge or enlargement 15 and which is employed to separate the handle section from the application section.

I further provide reenforcing rings which also serve as tone adjusters. Thus, an annular ring 16 is provided on the handle section, this ring merely serving as a reenforcement. A second ring 17 is provided on the application section and this ring is slidable along such application section so as to effectively vary the rattling sound. This furthers the objective of avoiding a rattling sound which is invariable as otherwise the dogs get used to it and are less apt to respond.

Rings 16 and 17 are of round cross-section and preferably of resilient rubber so that they may be slid or rolled along the device as required. As above stated, ring 16 is ordinarily stationary but ring 17 may be rolled or slid along the length of the application section so that it may occupy an intermediate position as illustrated in Figure 1. This will tend to tighten and confine the arcuate sections against large amplitude rattling and thus restrict such rattling. On the other hand, when the ring is rolled up toward the handle end the rod is capable of much louder rattling.

It will be obvious that the very nature of the device is such as to minimize the production of a sound of predetermined constancy because of the rattling nature of its components. Event such variable sound may be further varied from time to time, as above described, by adjusting the lower ring 17 along the length of the device so that if a dog tends to become accustomed to the sound, such sound can be varied at will. The dog will generally be directly struck upon the flank or any other desired portion of his body although it may also be used by hitting it against a solid object such as a table so that the dog hears the sound and may respond accordingly.

What is claimed is:

1. An animal training device comprising an elongated tubular member having a handle section at one end, and an application section forming the other end, said application section being formed with a plurality of parallel elongated slits extending up to the handle section, said elongated slits dividing said application section into a plurality of arcuate sections which are normally in edge-to-edge contact and being adapted to be brought forcibly into contact with the animal's body so as to produce a rattling of said arcuate sections.

2. A device according to claim 1 and wherein said slits are at least four in number so as to produce four such arcuate sections.

3. A device according to claim 1 and including an annular ring slidably disposed on said application section whereby the ring may be slid along the length thereof from the handle section downwardly so as to tighten the arcuate sections against each other in their edge-to-edge contact as the ring is slid downwardly.

4. A device according to claim 3 and wherein said slits are at least four in number so as to produce four arcuate sections, said annular ring being of resilient rubber material and of round cross-section, and said handle section being separated from said application section by an integral enlargement formed on said device.

5. A noise producing device for producing variable sounds upon being brought forcibly in contact with an animal's body, said device comprising an elongated tubular member having a handle section at one end, and an application section forming the other end, said application section being formed with a plurality of parallel elongated slits extending up to the handle section, said elongated slits dividing said application section into a plurality of arcuate sections which are normally in edge-to-edge contact so as to form a circle and being adapted to be brought forcibly into contact with the animal's body so as to produce a rattling of said arcuate sections.

References Cited in the file of this patent

UNITED STATES PATENTS

| 770,386 | Reineman | Sept. 20, 1904 |
| 2,678,158 | Arant | May 11, 1954 |

OTHER REFERENCES

Clipping: "Humane whip to drive cattle," Popular Mechanics, December 1939, page 944.